United States Patent
Lea

[11] 3,922,003
[45] Nov. 25, 1975

[54] SPRAY SHIELD FOR THE WHEELS OF A HIGHWAY VEHICLE

[75] Inventor: Harlan L. Lea, Largo, Fla.

[73] Assignee: Lancaster Colony Corporation, Wapakoneta, Ohio

[22] Filed: Oct. 29, 1974

[21] Appl. No.: 518,483

[52] U.S. Cl............................................. 280/154.5 R
[51] Int. Cl.² ........................................ B62D 25/16
[58] Field of Search............. 280/154.5 R, 152, 153

[56] References Cited
UNITED STATES PATENTS
2,940,773  6/1960  Eaves ........................... 280/154.5 R
3,721,459  3/1973  Lea ............................... 280/154.5 R

*Primary Examiner*—Robert R. Song
*Attorney, Agent, or Firm*—Henry K. Leonard

[57] ABSTRACT

A spray shield for the wheels of a highway vehicle. The shield consists of an assembly of two curved units, one for the front upper quadrant, and one for the back upper quadrant, and a selected number of horizontal straight units to extend over the top of the wheel or dual wheels or the tops of adjacent tandem wheels, for examples. Each individual curved or straight unit is reversible and its opposite ends have mating male or female elements for assembly in end-to-end assembly. Each unit has a downwardly or inwardly directed shoulder unit and the shoulder units also have cooperating male and female elements at their opposite ends. The main units have means for mounting the assembled shield in overlapping relationship to the wheels being shielded.

4 Claims, 13 Drawing Figures

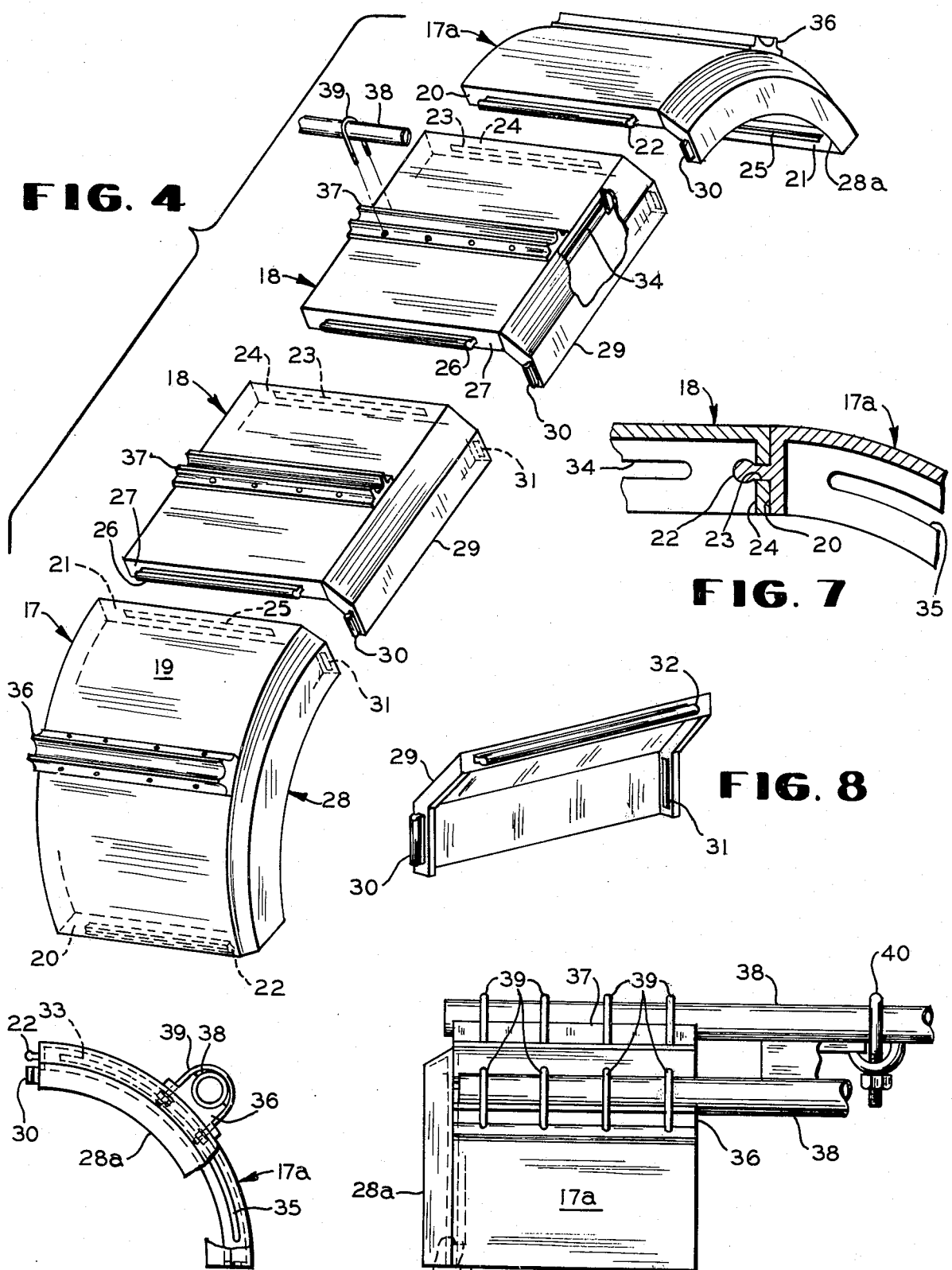

SPRAY SHIELD FOR THE WHEELS OF A HIGHWAY VEHICLE

BACKGROUND OF THE INVENTION

The use of hanging mud flaps positioned behind the wheels of highway trucks and trailers is reasonably effective for preventing road surface materials such as mud, pebbles, water and the like from being thrown backwardly by the rotating wheels of the truck or trailer. However, mud flaps are not effective for preventing heavy, outwardly directed, side spray which is thrown off the rotating wheels, often impinging upon flat under surfaces of the truck body or frame which is located above the wheels, and which results in an almost visually impenetrable spray, primarily consisting of fine droplets of water, mud and the like, into the area alongside of the truck. Such a side spray makes it dangerous and often almost impossible for a following driver to see around and in front of the truck, and when he attempts to pass the truck the side spray not only obscures vision by its existance in the air but also splatters or sprays a relatively heavy coat of dirty water on the windshield of the vehicle attempting to pass. This creates a serious hazard to drivers on the highways.

Although most passenger automobiles and the like are equipped with spray shields in the form of what are call "fenders", most highway trucks such as dual and tandem wheel tractors, and dual and tandem wheel trailers are not so equipped. As a result, highway vehicles of these types throw off a lateral spray from each of the numerous wheels which is not caught by the flaps or by any other confining surfaces.

A spray shield embodying the invention is so designed so as to intercept not only the back spray from the wheels but also to intercept and divert the side spray which is principally thrown off from the top 180° sectors of the wheels, and to deflect it downwardly closely adjacent the sides of the vehicle, thus eliminating the fog-like spray which is commonly encountered along-side heavy highway vehicles such as tractors, trucks, and truck-trailers.

It is therefore the principal object of the instant invention to provide a versatile spray shield comprising individual curved and straight units which have end-to-end and side-to-side inter-engaging means, and thus can be utilized in either a "right-hand" or a "left-hand" configuration, can be assembled with different numbers of the straight units cooperating with each other and with the curved units in order to provide shielding for single wheels, tandem wheels, or, even as many as three more wheels arranged one in front of the other in different spacings, and which can be readily mounted and dismounted from trucks and trailers.

BRIEF DESCRIPTION OF THE DRAWINGS

FIG. 4 is an isometric, exploded view showing the units of which a spray shield according to the invention is comprised;

FIG. 5 is a fragmentary view in end elevation taken from the position indicated by the line 5—5 of FIG. 2;

FIG. 6 is a detailed end elevational view, with parts broken away, taken from the left side of FIG. 5;

FIG. 7 is a fragmentary, enlarged, detailed view illustrating how the units of which the spray shield is comprised are connected to each other for assembly; and FIG. 8 is a view in perspective of one of the shoulder units which constitutes a part of a spray shield according to the invention.

DESCRIPTION OF PREFERRED EMBODIMENTS

Figure 1:
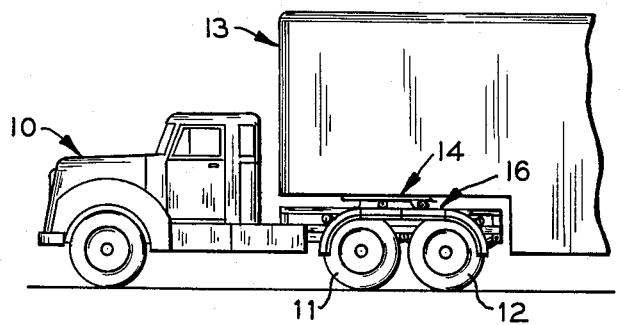
FIG. 1 is a fragmentary view in side elevation, on a small scale, showing a highway tractor equipped with a spray shield according to the invention.

FIG. 1 illustrates on a small scale a so-called semi-trailer arrangement in which a truck tractor 10 has tandem wheels comprising two pairs 11 and 12 with their axles parallel to each other so that the wheels 11 and 12 are spaced closely from front to back. The tractor 10 pulls a large trailer 13, only fragmentarily shown, which is conventionally mounted on the tractor 10 by a "fifth-wheel", generally indicated by the reference number 14.

Figure 2:
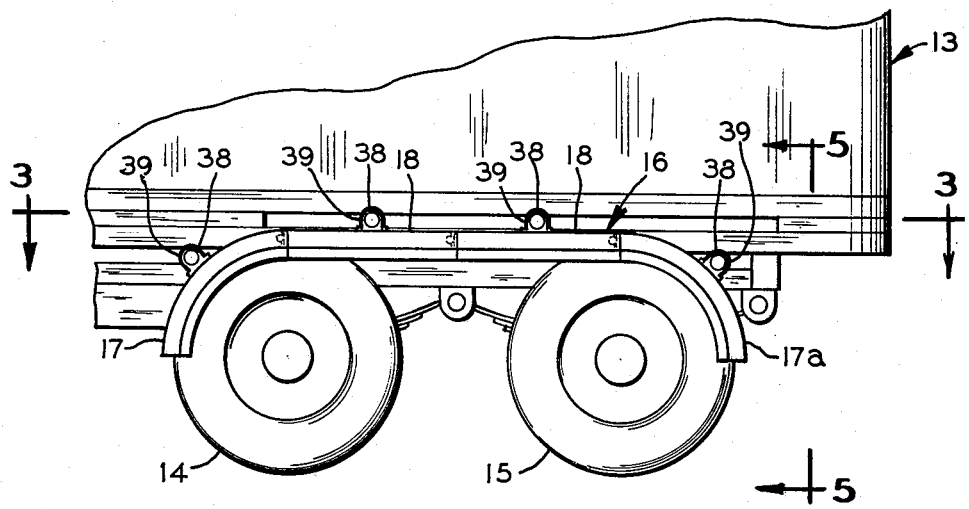
FIG. 2 is a fragmentary view in side elevation showing a tandem wheel trailer equipped with a spray shield according to the invention and illustrated on a slightly enlarged scale.
Figure 3:
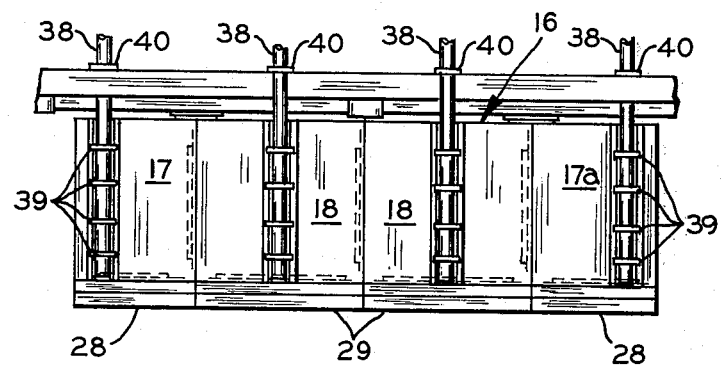
FIG. 3 is a fragmentary horizontal view taken along the line 3—3 of FIG. 2 and shown on a reduced scale.
Figure 9:
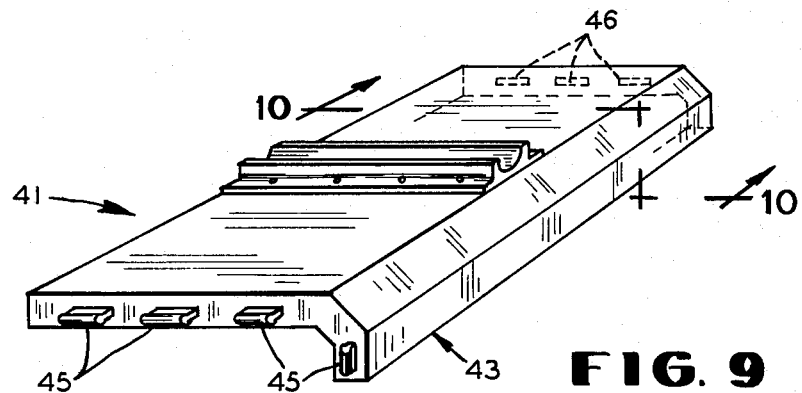
FIG. 9 is an isometric view of a modified straight unit having an integral shoulder portion.
Figure 10:
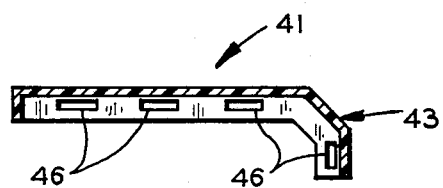
FIG. 10 is a vertical sectional view taken along the line 10—10 of FIG. 9.
Figure 11:
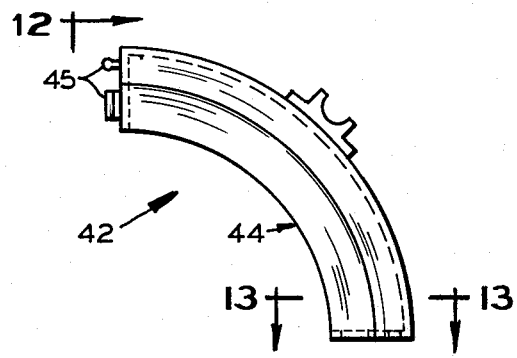
FIG. 11 is a side view in elevation of a modified curved unit having an integral shoulder portion.
Figure 12:
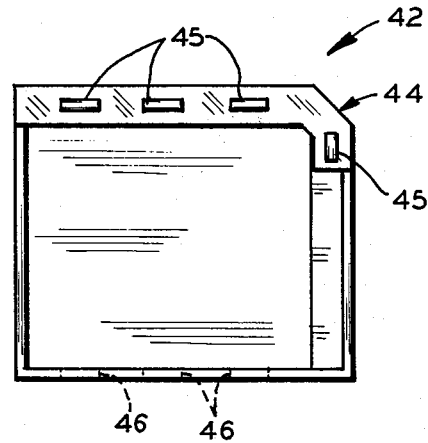
FIG. 12 is a view in elevation taken from the position indicated by the line 12—12 of FIG. 11.
Figure 13:
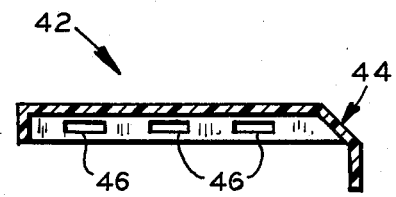
FIG. 13 is a horizontal sectional view taken along the line 13—13 of FIG. 11.

FIG. 2 is a fragmentary view in side elevation showing how the trailer 13 which also has tandem wheels 14 and 15 also may be equipped with a spray shield embodying the invention.

In either of the arrangements of FIG. 1 or FIG. 2, a spray shield generally indicated by the reference number 16 is illustrated as comprising two generally arcuately shaped, main spray shield units 17 and 17a which are identical with each other but arranged in the shield 16 so that the arcuate unit 17 is positioned at the upper front quadrant of the wheel 14 and the arcuate unit 17a is positioned at the upper rear quadrant of the wheel 15. The two arcuately shaped units 17 and 17a, in this arrangement, are connected to each other to complete the spray shield 16 by a pair of straight main units 18—18. The two straight units 18—18 are arranged in end-to-end relationship and the respective front and rear ends of the two straight units 18—18 are similarly in end-to-end relationship with the rear upper end of the arcuately shaped unit 17 and the front upper end of the arcuately shaped unit 17a.

Referring now to FIG. 4, the two units 17 and 17a are identical with each other and are arranged in opposed ended relationship in order to assemble a full shield 16. Each of the units 17—17a has a cylindrically curved upper surface 19, and end 20, and an opposite end 21. Each of the ends 20 has an elongated, rib-like protuberance 22 (see also FIG. 7) which functions as a male element of inter-engaging means also comprising a mating slot 23 in an end 24 of a straight unit 18. Similarly, slots 25 are formed in the ends 21 of the arcuately shaped units 17. Also, each of the straight units 18 has a rib-like protuberance 26 on its end 27, each of which is adapted to fit into either the slot 25 in the end of an arcuately shaped unit 17, or the similar slot 23 in the end 24 of a straight unit 18.

It will be observed, particularly in FIG. 7, that the protuberance or rib 22 has a vertical cross section of greater dimension at its end than it does at its base where it is connected to the respective end 20, for example. The vertical dimension or thickness of the protuberance or rib 22 at its base, however, fits snugly in the respective slot 23 or 25 as the case might be. By fabricating the units 17—17a of 18 from a stiffly deformable material, the ribs 22 or 26 can be forced into the slots 23 or 25 in a "snap-in" connection when the units 17—17a and 18 are assembled to form a shield 16.

It will also be appreciated, of course, that although elongated protuberances or ribs 22 and 26 are illustrated in the drawing with elongated slots 23 and 25, the ribs 22 and 26 could be replaced by buttons or mushroom shaped elements which would snap into holes in adjacent units for interengaging units of the assembly.

A shield embodying the invention also comprises two types of shoulder units, shown in FIG. 4, which are arcuately shaped shoulder units 28—28a and straight shoulder units 29. In common with the main units 17—17a and 18, the shoulder units 28—28a and 29 have protruding ribs 30 at corresponding ends and mating slots 31 at their opposite ends. Inter-engagement of the ribs 30 in the slots 31 of adjacent shoulder units retains the shoulder units 29 in end-to-end relationship and the arcuate units 28 and 28a at the ends of one or more straight units 29 when they are assembled in end-to-end relationship in a shield 16 utilizing a plurality of main units 18 and straight shoulder units 29.

The shoulder units 28—28a and 29 are assembled at the outer sides of the assembled main units 17—17a and 18 by similar assembly means comprising ribs 32 extending inwardly from the upper edges of the shoulder units 29 and similar arcuate ribs 33 (see FIG. 6) extending inwardly from the upper arms of the arcuate shoulder units 28—28a. The ribs 32 and 33 of their respective shoulder units again snap in to mating slots 34 in the sides of the straight main units 18 and similar slots 35 in the sides of the arcuately shaped main units 17—17a.

Although spray shields embodying the invention are illustrated in all of FIGS. 1, 2, 3, and 4 as comprising the two arcuately shaped, main units 17—17a and two of the straight main units 18, it will be appreciated that the number of straight main units 18 employed in any individual shield 16 is determined by the number of wheels to be covered by the individual shield and their spacing from each other on the vehicle to be equipped with the shield. While the spacing between tandem wheels of vehicles is more or less standard, within limits, straight main units 18 of different modular sizes may be supplied in order that a particular shield may readily be assembled to fit a particular truck or trailer. Therefore, not only is the number of straight shield units 18 not critical to the invention, but also the particular dimensions thereof, both fore and aft to insure the protection of one, two or three wheels, or laterally to insure that the shields extend outwardly relative to the wheels a sufficient distance to completely overlie a single wheel or dual wheel, as the case might be. Similarly, the lateral and vertical extent of the shoulder units 28—28a and 29 is not fixed but is selected so that their radially inward extent is sufficient to go beyond the peripheries of the wheels being shielded. Thus, the side spray which would otherwise be thrown off by these wheels is intercepted by the depending walls of the shoulder units and prevented from flying out into the air adjacent the vehicle to obstruct the vision of following vehicles.

Each of the main units 17—17a or 18 has a semicylindrical saddle 36 or 37 which, for example, receives a horizontal outwardly extending support pipe or bar 38 clamped to the respective unit 17—17a or 18 by a series of U-bolts 39. The pipes 38 are similarly clamped to a chasis frame element by clamping bolts 40.

It will also be observed that each of the arcuately shaped main units 17—17a has an arcuate extent of approximately 90° and that its saddle 36 is located at the 45 degree point so that a shield 16 consists of only two types of main units, the unit identified by the reference number 17 being identical with that identified with reference number 17a and merely positioned oppositely. Similarly, by reason of the configurations of the main units 17—17a and 18, a shield 16 may be assembled at either the left-hand side or the right-hand side of a vehicle utilizing identical elements, merely reversed relative to each other. Thus, the main units 17—17a and 18 have the respective slots 34 and 35 in at both of their sides so that when they are reversed, shoulder elements 28—28a and 29 may readily be attached at their outer sides.

FIGS. 9–13, inclusive, illustrate a second embodiment in which both straight units 41 and curved units 42 have integral shoulder portions 43 or 44, respectively. As in the earlier described embodiment, the straight units 41, curved units 42 and shoulder portions 43 and 44 have male connectors 45 at one end and female receivers or slots or holes, 46 at their opposite ends in order to assemble the shield units to each other. Similarly, of course, both the straight units 41 and the curved units 42 are reversible so that they can be assembled in either "right-hand" or "left-hand" arrangements for use on either side of a vehicle.

I claim:

1. A spray shield for the wheels of a highway vehicle, said shield comprising, in combination,
   a. two generally arcuately shaped main units, each adapted to be positioned selectively at the front or rear upper quadrant of a wheel,
   b. at least one straight main unit adapted to be positioned horizontally above a wheel and to be connected to the upper ends of said arcuately shaped units, all of said units being fabricated from stiffly deformable material,
   c. interengaging elements at the ends of all of said units for assembly of said units in end-to-end relationship,
   d. generally arcuately shaped and straight shoulder portions at the outer edges of the similarly shaped ones of said main units and extending outwardly and downwardly relative to said main units,
   e. interengaging elements at the ends of shoulder portions for assembly thereof in end-to-end relationship,
   f. each of said interengaging elements consisting of a male protuberance at one end of each of said units and a female opening at the other end of each of said units, said protuberances having cross sections at their ends larger than the cross sections of said female openings for snap-in engagement there between, and
   g. means for mounting said shield in overlapping relationship to the wheels to be shielded.

2. A spray shield according to claim 1 in which the shoulder portions are integral with the main units.

3. A spray shield according to claim 1 in which the shoulder portions are separate units and are assembled to the edges of the main units by interengaging elements extending along their adjacent edges.

4. A spray shield according to claim 1 in which the main units have a horizontal width greater than the width of the wheels to be shielded and the shoulder units extend radially inwardly beyond the peripheries of such wheels.

* * * * *